(12) United States Patent
Peterson, III et al.

(10) Patent No.: US 10,215,940 B1
(45) Date of Patent: Feb. 26, 2019

(54) FIBER OPTIC ASSEMBLY WITH BOTH PUSH AND PULL MATERIAL

(71) Applicant: SMLZ, Inc., Farmingdale, NY (US)

(72) Inventors: Christian A. Peterson, III, West Babylon, NY (US); Barry Skolnick, Islip, NY (US); Roman Krawczyk, Lindenhurst, NY (US)

( * ) Notice: Subject to any disclaimer, the term of this patent is extended or adjusted under 35 U.S.C. 154(b) by 0 days.

(21) Appl. No.: 15/829,556

(22) Filed: Dec. 1, 2017

(51) Int. Cl.
*G02B 6/44* (2006.01)

(52) U.S. Cl.
CPC ......... *G02B 6/4432* (2013.01); *G02B 6/4434* (2013.01); *G02B 6/4435* (2013.01); *G02B 6/4463* (2013.01); *G02B 6/4488* (2013.01); *G02B 6/4494* (2013.01)

(58) Field of Classification Search
CPC .. G02B 6/4432; G02B 6/4494; G02B 6/4463; G02B 6/4434; G02B 6/4488; G02B 6/4435
See application file for complete search history.

(56) References Cited

U.S. PATENT DOCUMENTS

| | | | | |
|---|---|---|---|---|
| 9,182,562 | B2 * | 11/2015 | Peterson, III | G02B 6/4435 |
| 9,885,844 | B2 * | 2/2018 | Peterson, III | G02B 6/4433 |
| 9,927,589 | B2 * | 3/2018 | Peterson, III | G02B 6/4435 |
| 2003/0118295 | A1 * | 6/2003 | Lail | G02B 6/4411 |
| | | | | 385/101 |
| 2006/0239624 | A1 * | 10/2006 | Hsu | G02B 6/4429 |
| | | | | 385/107 |
| 2008/0008430 | A1 * | 1/2008 | Kewitsch | G02B 6/4478 |
| | | | | 385/113 |
| 2011/0075979 | A1 * | 3/2011 | Ma | G02B 6/4427 |
| | | | | 385/107 |
| 2015/0104136 | A1 * | 4/2015 | Peterson, III | G02B 6/4435 |
| | | | | 385/103 |
| 2016/0131863 | A1 * | 5/2016 | Peterson, III | G02B 6/4435 |
| | | | | 385/107 |
| 2016/0195686 | A1 * | 7/2016 | Peterson, III | G02B 6/4433 |
| | | | | 385/107 |
| 2018/0188464 | A1 * | 7/2018 | Peterson, III | G02B 6/4435 |

* cited by examiner

*Primary Examiner* — Andrew Jordan
(74) *Attorney, Agent, or Firm* — Feldman Law Group, P.C.; Steven M. Crosby

(57) ABSTRACT

The specification relates to a fiber optic cable assembly. The fiber optic cable assembly includes: an outer jacket, the outer jacket being made from polyethylene; a pull material, the pull material being made from aramid and water blocking fibers; a push body, the push body being made from a rigid material so that the fiber optic cable assembly can be pushed without bending; and at least one fiber optic fiber.

22 Claims, 2 Drawing Sheets

FIBER OPTIC ASSEMBLY WITH BOTH PUSH AND PULL MATERIAL

BACKGROUND

The disclosed technology relates generally to a fiber optic assembly.

Traditionally, fiber optic assemblies include optical fibers that conduct light for transmitting voice, video and/or data. The construction of fiber optic cables preserves optical performance of the fibers when deployed in an intended environment while also meeting official standards for the environment. For instance, indoor cables for riser and/or plenum spaces may require certain flame-retardant ratings to meet the demands of the space. These flame-retardant ratings can be in addition to mechanical requirements or desired characteristics for the space, e.g., crush performance, permissible bend radii, temperature performance, and the like. These characteristics are desired to inhibit undesirable optical attenuation or impaired performance during installation and/or operation within the space.

By way of example, some indoor applications use a fiber optic cable disposed within an armor layer for providing improved crush performance in riser and/or plenum spaces. For instance, conventional armored constructions have a fiber optic cable disposed within a metallic interlocking armor. This interlocking armor can be wound about the fiber optic cable so that the edges of the adjacent wraps of armor mechanically interlock forming an interlocked armor layer with a large bend radius, e.g., greater than 75 mm and a large outside diameter (OD), e.g., 12.5 mm.

SUMMARY

This specification describes technologies relating to a fiber optic assembly with a push body that allows small flexible fiber optic cable assemblies to be pushed through small cable runs, e.g., data centers, cable trays and under raised floors.

In one implementation, a fiber optic cable assembly comprising: an outer jacket, the outer jacket being made from polyethylene; a pull material, the pull material being made from aramid and water blocking fibers; a push body, the push body being made from a rigid material so that the fiber optic cable assembly can be pushed during installation; and at least one fiber optic fiber.

In some implementations, the push body can be at least one rigid wire. In some implementations, the at least one rigid wire can be made from steel. In some implementations, the at least one rigid wire can have a diameter of 0.2 to 0.6 mm. In some implementations, the at least one rigid wire can be partially attached to an inside wall of the outer layer.

In some implementations, the fiber optic cable assembly can further comprise an armor body. In some implementations, the armor body can be steel micro armor.

In some implementations, the pull material can be sandwiched between the outer layer and the armor body. In some implementations, the at least one fiber optic fiber can be a tight buffer fiber.

In some implementations, the push body can be a rigid, hollow tube. In some implementations, the tube can be seamless. In some implementations, the tube can be made from stainless steel. In some implementations, the tube can be made from SUS 304. In some implementations, the tube can have an outer diameter of 0.8 to 2.2 mm. In some implementations, the tube can have an inner diameter of 0.6 to 1.2 mm. In some implementations, the tube can have thickness of 0.1 to 0.3 mm.

In some implementations, the fiber optic cable assembly can further comprise an armor body. In some implementations, the armor body can be steel tube. In some implementations, the pull material can be sandwiched between the outer layer and the armor body.

In some implementations, the fiber optic cable assembly can further comprise a strengthening material surrounding the at least one fiber optic fiber underneath the push body. In some implementations, the strengthening material can be made from aramid and water blocking fibers. In some implementations, the pull material can be made from aramid and water blocking fibers.

The advantages of the fiber optic cable is that it is highly flexible and thin but capable of maintaining rigidity for longer runs when running cable thereby making the cable much easier to install and saving space in data centers, cable trays and under raised floors.

DETAILED DESCRIPTION

Figure 1:
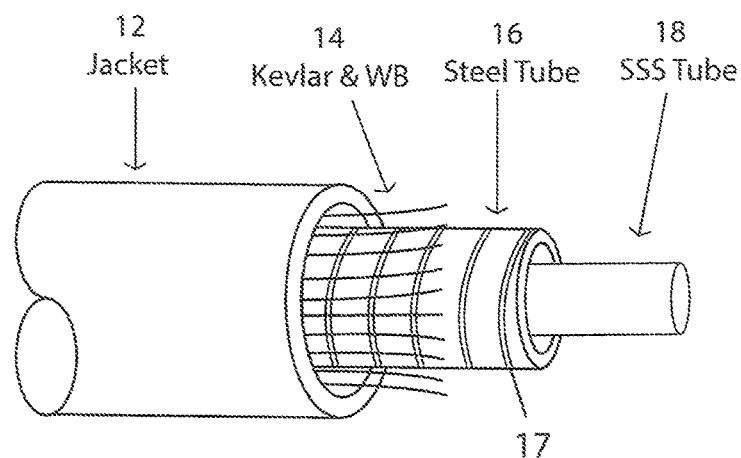
FIG. 1 shows a side view of a fiber optic assembly of the disclosed technology.

This specification describes technologies relating to fiber optic cable assemblies. The fiber optic cable of the disclosed technology is small, flexible and armored fiber optic cable with a push body that allows the small, flexible and armored fiber optic cable assemblies to be pushed through small cable runs, e.g., data centers, cable trays and under raised floors.

Fiber optic cable assemblies refer to the complete assembly of fibers, e.g., buffer tubes, ripcords, stiffeners, strengthening material, outer and inner protective coverings, etc. Fiber optic cable assemblies provide protection for the optical fiber or fibers within the environment in which the cable is installed. Fiber optic cable assemblies come in many different types, depending on the number of fibers and how and where it will be installed.

A function of the cable assembly is to protect the fibers from the environment encountered in and after installation, e.g., will the cable: (1) become wet or moist; (2) have to withstand high pulling tension for installation in conduit or continual tension as in aerial installations; (3) have to be flame-retardant; (4) be installed around tight bends; (5) be exposed to chemicals; (6) have to withstand a wide temperature range; (7) be gnawed on by rodents; and (8) be exposed to any other environmental issues.

The bend radius is of particular importance in the handling of fiber optic cables. The minimum bending radius varies with different cable designs. That is, optical fiber is sensitive to stress, particularly bending. When stressed by bending, light in the outer part of the core is no longer guided in the core of the fiber so some is lost, coupled from the core into the cladding, creating a higher loss in the stressed section of the fiber. Fiber coatings and cables are designed to prevent as much bending loss as possible, but its part of the nature of the fiber design. Bending losses are a function of the fiber type (e.g., single mode or multi mode), fiber design (e.g., core diameter and numerical aperture), transmission wavelength (e.g., longer wavelengths are more sensitive to stress) and cable design (e.g., fire resistance and/or crush resistance). The normal recommendation for fiber optic cable bend radius is the minimum bend radius under tension during pulling is 20 times the diameter of the cable. When not under tension, the minimum recommended long term bend radius is 10 times the cable diameter. Besides mechanical destruction, excessive bending of fiber-optic cables can cause microbending and macrobending losses. Microbending causes light attenuation induced by deformation of the fiber while macrobending loss refers to losses induced in bends around mandrels or corners in installations.

To avoid microbending and macrobending issues, bend insensitive fiber have been developed. Bend insensitive (BI) fiber cable offers greater flexibility in demanding environments than traditional fiber cable. It is typically used in data centers or any space constrained area where tight bends and flexibility are required. Bend-insensitive fibers may add a layer of glass around the core of the fiber which has a lower index of refraction that literally "reflects" weakly guided modes back into the core when stress normally causes them to be coupled into the cladding. In some fibers, a trench, or moat, surrounds the core in both BI single mode fiber (SMF) and BI multi mode fiber (MMF) to reflect lost light back into the core. The trench is an annular ring of lower index glass surrounding the core with very carefully designed geometry to maximize the effect. Bend-insensitive fiber has obvious advantages. In patch panels, it does not suffer from bending losses where the cables are tightly bent around the racks. In buildings, it allows fiber to be run inside molding around the ceiling or floor and around doors or windows without inducing high losses. It's also guards against problems caused by careless installation.

Many applications for BI SMF are in premises installations like apartment buildings or for patchcords, where it simplifies installation and use. BI SMF is also used in outside plant cables since it allows fabrication of smaller, lighter high fiber count cables.

In many applications were BI fiber are used, the fiber may be exposed crush loads as well as rodents. The problem that arises is that the armor used to protect standard fiber has a bend radius of usually <75 and an OD of 12.5 mm. When used in applications with tight bend area, the armored cable either does not fit into tight spaces due to its large OD and/or does not conform to a necessary bend. In these cases, unarmored fiber optic cables are used. This leaves open the possibility of the cable being crushed or cut.

Another problem with fiber is that some fiber assemblies does not have rigidity for pushing a cable assembly through a long run. That is, the proper method of pulling fiber optic cables is always to attach a pull rope, wire or tape to the pull material. In these installations, fish tape can be utilized to extend from one side of a long run to the other. Once ran, the fiber assembly can be attached to the fish tape and pulled to the desired location. Using fish tape has its own set of problems, e.g., the attachment gets undone in the middle of the run and needs to be further secured. Also, there is cost of buying the fish tape and having a proper length for your installation project.

The subject matter of the disclosed technology overcomes this problem by incorporating a rigid material within the fiber optic assembly so that the assembly can be pushed from one end of a run to the other without the need for fish tape.

Figure 2:
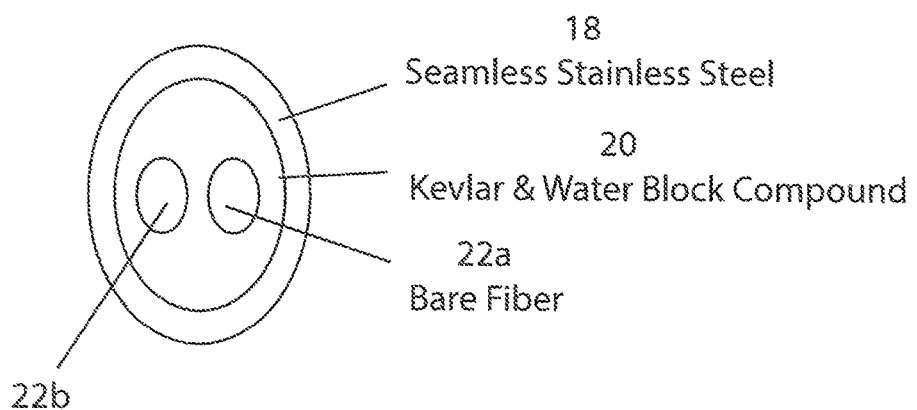
FIG. 2 shows a cross section of the fiber optic assembly according to FIG. 1.

As shown in FIGS. 1 and 2, the fiber optic cable assembly 10 can include an outer jacket 12, a pull material 14, stainless steel armor 16, a push body 18, strength material 20 and one or more optic fibers 22a, 22b.

The outer jacket 12 is the outermost layer of protection for the fibers 22a, 22b that is chosen to withstand the environment in which the cable assembly 10 is installed. For outside cables, the outer jacket 12 will generally be black polyethylene (PE) which resists moisture and sunlight exposure. For indoor cables, the outer jacket 12 may be a flame-retardant jacket that can be color-coded to identify the fibers 22a, 22b inside the cable assembly 10, e.g., PVC, LSZH, TPU, ETFE or OFNP. The outer jacket 12 thickness can be approximately 0.25 mm-7.5 mm and come in a variety of colors, e.g., yellow, orange, aqua, blue, etc.

Under the outer jacket 12 is the outer pull material 14. The outer pull material 14 can be aramid fibers and a water backing material. The outer pull material 14 can absorb the tension needed to pull the cable assembly 10 during installation. Aramid fibers are used because of their strength and the fact that they do not stretch. If pulled hard, the aramid fibers will not stretch but may eventually break when tension exceeds their limits. For short term stresses, the maximum tension is approximately 800N. For long term stresses, the maximum tension is approximately 600N.

The armor 16 can be a non-interlocking stainless steel tube, e.g. SUS 204. The benefit of using a non-interlocking armor is that the bend radius is substantially smaller than a bend radius of an interlocked steel tube. It is also much lighter and easier to work with. The armor 16 can be a spiral tube having a gap 17 between each spiraling ring, the gap 17 can be 0.05 mm to 1 mm. The armor 16 cab be a spiral tube having an outer diameter of approximately 1.5 mm-5.5 mm, a thickness of approximately 0.25 mm-0.75 mm and an inner diameter of approximately 0.75 mm-5.25 mm. The armor has a crush resistance of approximately a ≥100 KGf/100 mm. The armor 14 offers increased crush protection, higher axial strength and corrosion resistance. However, other armored steel tubes are contemplated.

The strengthening material 20 at least partially surrounds the optical fibers 22a, 22b. The strengthening material 20 may be formed of any suitable material. According to some embodiments, the strengthening material 18 can be aramid fibers. Other suitable materials may include fiberglass or polyester. The strengthening material 20 can be aramid fibers which can absorb the tension needed to pull the inner cable and provide cushioning for the fibers 22a, 22b, thus ensuring that the optical fibers do not stretch or bind within the cable.

Optical fibers 22a, 22b can be a tight buffer fiber having a core 62 and a cladding layer 64. The core 62 can be a bare optical fiber and the cladding layer 64 can be a nylon both of which can be selected for total internal reflection due to the difference in the refractive index between the two. The bare fiber 62 can also be coated with a layer of acrylate polymer or polyimide. This coating protects the bare fiber 62 from damage but does not contribute to its optical waveguide properties. Individual coated fibers (or fibers formed into ribbons or bundles) then have a tough resin buffer layer and/or core tube(s) extruded around them to form the cable core. A standard fiber has a primary buffer coating of approximately 250 microns and can add a tight buffer coating such as a soft protective coating applied directly to the 250 micron coated fiber to provide additional protection for the fiber, allowing easier handling and even direct termination for the fiber. In some implementations, the optical fibers 22a, 22b can be 62.5/125 µm multimode fibers, 50/125 µm 10G OM3/OM4 fibers, 9/125 µm single mode G.652.D fibers, 9/125 µm single mode bend-insensitive fibers, or any suitable fibers, for example, G.657.A1, G.657.A2, G.657.B1, G.657.B2, G.657.B3.

The push body 18 can be a seamless stainless steel tube that surrounds the strengthening material 18 and the optical fibers 22a, 22b. The push body 18 is capable of acting as a fish tape but can be bent to accommodate tight turns. In some implementations, the push body can be a rigid, hollow tube. In some implementations, the tube can be seamless. In some implementations, the tube can be made from stainless steel. In some implementations, the tube can be made from SUS 304. In some implementations, the tube can have an outer diameter of 0.8 to 2.2 mm, an inner diameter of 0.6 to 1.2 mm and a thickness of 0.1 to 0.3 mm.

The fiber optic cable assembly 10 can have (1) a short term maximum tension of 200N and a long term maximum tension of 400N, (2) a short term crush resistance (N/100m) of 5000N and a long term crush resistance (N/100m) of 2500N, (3) an insertion loss of 1310 nm-1550 nm and (4) a minimum bend radius of 20D for dynamic and 10D for static.

Figure 3:
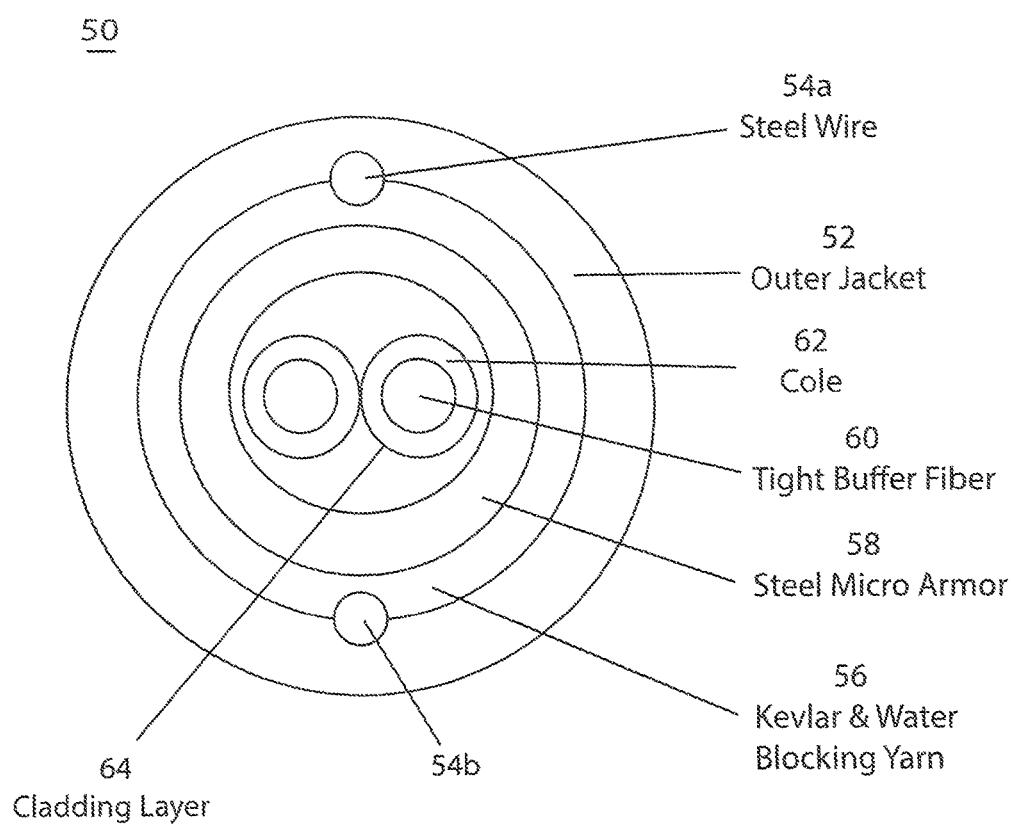
FIG. 3 shows a side view of a second implementation of a fiber optic assembly of the disclosed technology.

As shown in FIG. 3, the fiber optic cable assembly 50 can include an outer jacket 52, one or more push bodies 54a, 54b, a pull material 56, stainless steel armor 58, and one or more tight buffer fibers 60a, 60b.

The outer jacket 52 is the outermost layer of protection for the fibers 60a, 60b that is chosen to withstand the environment in which the cable assembly 50 is installed. For outside cables, the outer jacket 52 will generally be black polyethylene (PE) which resists moisture and sunlight exposure. For indoor cables, the outer jacket 52 may be a flame-retardant jacket that can be color-coded to identify the fibers 60a, 60b inside the cable assembly 10, e.g., PVC, LSZH, TPU, ETFE or OFNP. The outer jacket 52 thickness can be approximately 0.25 mm-5 mm and come in a variety of colors, e.g., yellow, orange, aqua, blue, etc.

Under the outer jacket 52 is the outer pull material 56. The outer pull material 56 can be aramid fibers and a water blocking material, e.g., yarn. The outer pull material 56 can absorb the tension needed to pull the cable assembly 50 during installation. Aramid fibers are used because of their strength and the fact that they do not stretch. If pulled hard, the aramid fibers will not stretch but may eventually break when tension exceeds their limits. For short term stresses, the maximum tension is approximately 800N. For long term stresses, the maximum tension is approximately 600N.

In between the outer jacket 52 and the pull material 56 is the one or more push bodies 54a, 54b. The push bodies 54a, 54b can be one or more rigid wires. The push bodies 54a, 54b is capable of acting as a fish tape but can be bent to accommodate tight turns. The push bodies 54a, 54b can have a diameter of 0.2 to 0.6 mm. The push bodies 54a, 54b can be made steel. In some implementations, the push bodies 54a, 54b can be partially attached to an inside wall of the outer layer.

The armor 58 can be a non-interlocking stainless steel tube, e.g. SUS 204. The benefit of using a non-interlocking armor is that the bend radius is substantially smaller than a bend radius of an interlocked steel tube. It is also much lighter and easier to work with. The armor 58 can be a spiral tube having a gap 59 between each spiraling ring, the gap 59 can be 0.05 mm to 1 mm. The armor 16 cab be a spiral tube having an OD of approximately 1.5 mm-5.5 mm, a thickness of approximately 0.25 mm-0.75 mm and an inner diameter of approximately 0.75 mm-5.25 mm. The armor has a crush resistance of approximately ≥100 KGf/100 mm. The armor 58 offers increased crush protection, higher axial strength and corrosion resistance. However, other armored steel tubes are contemplated.

Optical fibers 22a. 22b consist of a core and a cladding layer, selected for total internal reflection due to the difference in the refractive index between the two. In practical fibers, the cladding is usually coated with a layer of acrylate polymer or polyimide. This coating protects the fiber from damage but does not contribute to its optical waveguide properties. Individual coated fibers (or fibers formed into ribbons or bundles) then have a tough resin buffer layer and/or core tube(s) extruded around them to form the cable core. A standard fiber has a primary buffer coating of approximately 250 microns and can add a tight buffer coating such as a soft protective coating applied directly to the 250 micron coated fiber to provide additional protection for the fiber, allowing easier handling and even direct termination for the fiber.

In some implementations, the optical fibers 20 can be 62.5/125 μm multimode fibers, 50/125 μm 10G OM3/OM4 fibers, 9/125 μm single mode G.652.D fibers, 9/125 μm single mode bend-insensitive fibers, or any suitable fibers, for example, G.657.A1, G.657.A2, G.657.B1, G.657.B2, G.657.B3.

The fiber optic cable assembly 50 can have (1) a short term minimum allowable tension strength of 150N and a long term minimum allowable tension strength of 80N, (2) a short term crush load (N/100m) of 2500N and a long term crush load (N/100m) of 1000N, (3) an insertion loss (attenuation) of 1310 nm-1550 nm and (4) a minimum bend radius of 20 for dynamic and 10D for static.

While this specification contains many specific implementation details, these should not be construed as limitations on the scope of the disclosed technology or of what can be claimed, but rather as descriptions of features specific to particular implementations of the disclosed technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The foregoing Detailed Description is to be understood as being in every respect illustrative, but not restrictive, and the scope of the disclosed technology disclosed herein is not to be determined from the Detailed Description, but rather from the claims as interpreted according to the full breadth permitted by the patent laws. It is to be understood that the implementations shown and described herein are only illustrative of the principles of the disclosed technology and that various modifications can be implemented without departing from the scope and spirit of the disclosed technology.

The invention claimed is:

1. A fiber optic cable assembly comprising:
   an outer jacket, the outer jacket being made from polyethylene;
   a pull material, the pull material being made from aramid and water blocking fibers;
   a push body, the push body being made from a rigid material so that the fiber optic cable assembly can be pushed during installation; and
   at least one fiber optic fiber.

2. The fiber optic cable assembly of claim 1 wherein the push body is at least one rigid wire.

3. The fiber optic cable assembly of claim 2 wherein the at least one rigid wire is made from steel.

4. The fiber optic cable assembly of claim 3 wherein the at least one rigid wire has a diameter of 0.2 to 0.6 mm.

5. The fiber optic cable assembly of claim 2 further comprising:
an armor body.

6. The fiber optic cable assembly of claim 5 wherein the armor body is steel micro armor.

7. The fiber optic cable assembly of claim 5 wherein the pull material is sandwiched between the outer layer and the armor body.

8. The fiber optic cable assembly of claim 2 wherein the at least one rigid wire is partially attached to an inside wall of the outer layer.

9. The fiber optic cable assembly of claim 1 wherein the at least one fiber optic fiber is a tight buffer fiber.

10. The fiber optic cable assembly of claim 1 wherein the push body is a rigid, hollow tube.

11. The fiber optic cable assembly of claim 10 wherein the tube is seamless.

12. The fiber optic cable assembly of claim 11 wherein the tube is made from stainless steel.

13. The fiber optic cable assembly of claim 12 wherein the tube is made from SUS 304.

14. The fiber optic cable assembly of claim 10 wherein the tube has an outer diameter of 0.8 to 2.2 mm.

15. The fiber optic cable assembly of claim 10 wherein the tube has an inner diameter of 0.6 to 1.2 mm.

16. The fiber optic cable assembly of claim 10 wherein the tube has thickness of 0.1 to 0.3 mm.

17. The fiber optic cable assembly of claim 10 further comprising:
an armor body.

18. The fiber optic cable assembly of claim 17 wherein the armor body is steel tube.

19. The fiber optic cable assembly of claim 10 further comprising:
a strengthening material surrounding the at least one fiber optic fiber underneath the push body.

20. The fiber optic cable assembly of claim 19 wherein the strengthening material is made from aramid and water blocking fibers.

21. The fiber optic cable assembly of claim 10 wherein the pull material is made from aramid and water blocking fibers.

22. The fiber optic cable assembly of claim 21 wherein the pull material is sandwiched between the outer layer and the armor body.

* * * * *